No. 810,526. PATENTED JAN. 23, 1906.
T. GARE.
WHEEL FOR VEHICLES.
APPLICATION FILED JAN. 15, 1904.

Witnesses
Alfred Bosshardt.
Stanley E. Bramall.

Inventor
Thomas Gare
Per F. Bosshardt
Attorney.

UNITED STATES PATENT OFFICE.

THOMAS GARE, OF NEW BRIGHTON, ENGLAND.

WHEEL FOR VEHICLES.

No. 810,526.  Specification of Letters Patent.  Patented Jan. 23, 1906.

Application filed January 15, 1904. Serial No. 189,173.

*To all whom it may concern:*

Be it known that I, THOMAS GARE, a subject of the King of Great Britain, residing at New Brighton, in the county of Chester, England, have invented new and useful Improvements in Wheels for Vehicles, of which the following is a specification.

My invention relates to improvements in wooden disk wheels, and has for its object to so construct the same that they are rendered more durable and resilient than hitherto has been the case. I attain these objects by the means illustrated in the accompanying drawings, in which—

Figure 1:
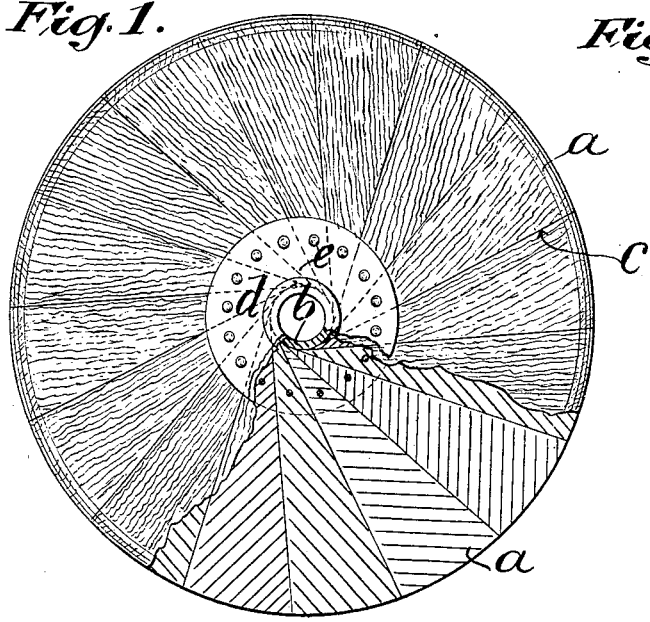
Figure 2:
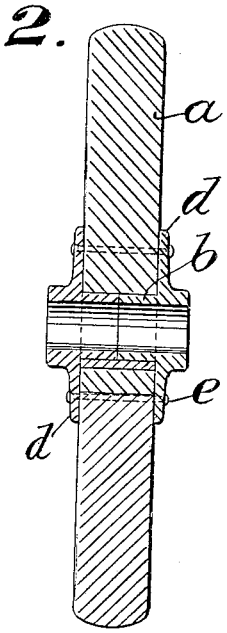
Figure 3:
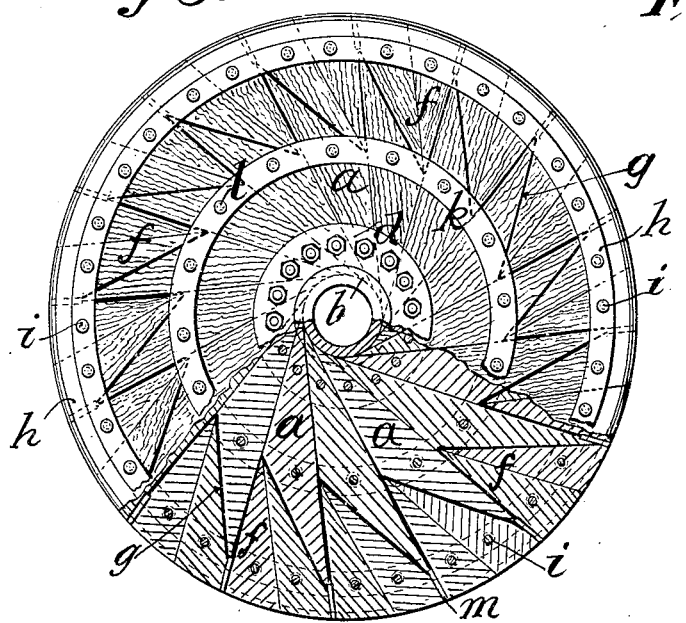
Figure 4:
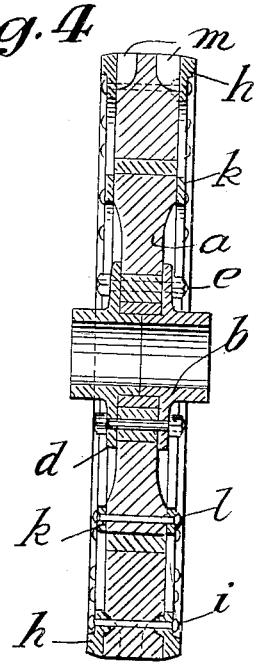

Figures 1 and 3 are side views, partly in section, and Figs. 2 and 4 cross-sections, respectively, of a wooden disk wheel constructed in accordance with my invention.

Similar letters refer to similar parts throughout the several views.

In carrying out my invention in respect of wooden disk wheels formed of segmental sections $a$, Figs. 1 and 2, I so cut and arrange the latter that their sides are fitting against each other tangent to the bore, boss, or hub $b$ of the wheel, and thereby cause the pressure exerted upon their outer ends or wearing-surface of the wheel to be transmitted obliquely to the side of the grain instead of radially against the end of the grain of the said segmental sections, and thus give more resilience and also render the wheel more durable, the said segmental sections arranged as described being also less liable to split and wear. In order to produce a good joint between the said segmental sections, the adjoining edges $c$ thereof are coated with cement, to which pieces of vulcanized rubber may be added. The said segmental sections are placed between the two flanges $d\,d$, formed on the two-part boss or hub $b$ of the wheel and circumferentially subjected to great pressure, which forces them together against the boss or hub $b$, and while under such compression holes are drilled through the said sections and flanges and the former secured to the latter by rivets $e$ or bolts passed through the said holes, the vulcanized rubber inserted between the said edges providing additional resiliency. The periphery of the wheel thus built may be left plain to form the actual wearing-surface or it may be grooved or furnished with a channel to receive a suitable rubber or other tire as wearing-surface, as will be readily understood. To further increase the resiliency of the wooden disk wheel described and also of such with radially-arranged segmental sections, I may so shape the said segmental sections $a$ in diamond or other fashion as to form a circular zigzag or undulated surface providing recesses for the reception of correspondingly-shaped pieces of wood $f$, supported by strips $g$, of rubber or other suitable resilient material, inserted into the said recesses, thus isolating the actual wearing-surface from the body and at the same time increasing the resiliency of the wheel.

In order to hold the pieces $f$ upon the segmental sections $a$ radially and laterally in position, I secure against each side thereof a metal ring $h$ by means of rivets $i$ or bolts passing through the said pieces. I also secure the said segmental sections $a$ together at or near their middle by means of other rings $k$, rivets $l$, or bolts passing through the same. The outer rings $h$ are formed with lugs $m$, adapted to engage between the wedge-shaped pieces $a$, and thus hold the same circularly in position.

What I claim as my invention, and desire to secure by Letters Patent, is—

1. In a vehicle-wheel, segmental sections with their sides fitting against each other tangent to the bore of the wheel, substantially as and for the purpose set forth.

2. In a vehicle-wheel, segmental sections fitted together tangentially to the bore of the wheel and vulcanized rubber inserted between the said sections, all combined substantially as and for the purpose set forth.

3. In a vehicle-wheel, segmental sections with their sides fitting against each other tangent to the bore of the wheel, a boss in the latter having flanges and rivets through the said flanges and segmental sections securing the same together, all combined substantially as and for the purpose set forth.

4. In a vehicle-wheel, segmental sections fitted together around the bore of the wheel and shaped to provide a zigzag circumference forming recesses, wedge-like pieces fitted into the latter and vulcanized rubber inserted between the said zigzag or undulated circumference and the said wedge-shaped pieces, all substantially as and for the purpose set forth.

5. In a vehicle-wheel, segmental sections fitted together around the bore of the wheel and shaped to provide a zigzag circumference forming recesses, wedge-like pieces fitted into the latter, rubber inserted between the said sections and wedge-like pieces, a boss in the bore of the wheel having flanges, rings at each side of the wheel and rivets passing through the said segmental sections and wedge-shaped pieces, flanges and rings respectively, all substantially as and for the purpose set forth.

In witness whereof I have hereunto set my hand in presence of two witnesses.

THOMAS GARE.

Witnesses:
ALFRED BOSSHARDT,
STANLEY V. BRAMALL.